No. 710,793. Patented Oct. 7, 1902.
F. MITCHELL.
PNEUMATIC TIRE.
(Application filed July 8, 1902.)
(No Model.) 2 Sheets—Sheet 1.
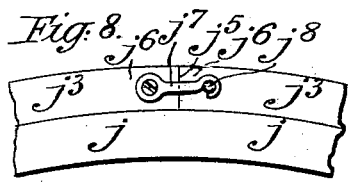
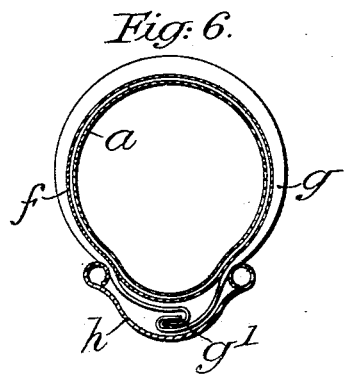
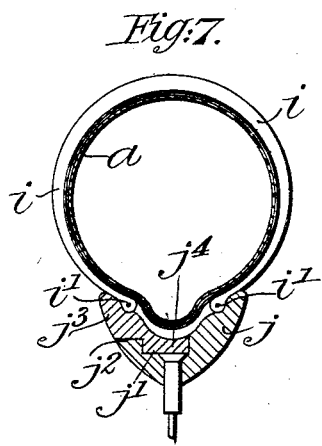
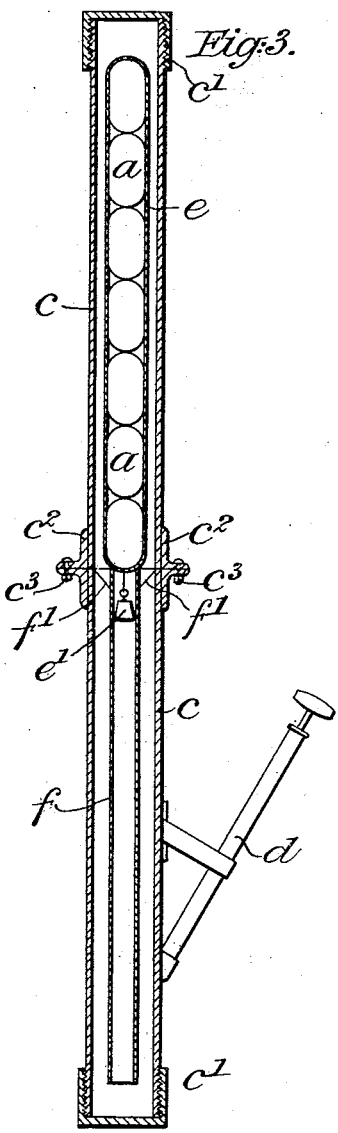
Witnesses:
M. A. Witherell
Wm. R. Hammond
Inventor
Frank Mitchell,
By Knight Bros.
Attys.

No. 710,793. Patented Oct. 7, 1902.
F. MITCHELL.
PNEUMATIC TIRE.
(Application filed July 8, 1902.)
(No Model.) 2 Sheets—Sheet 2.
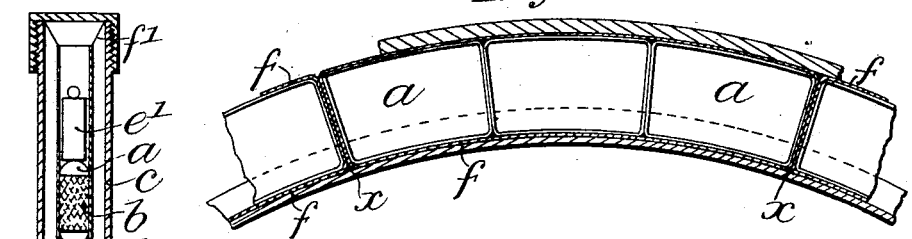
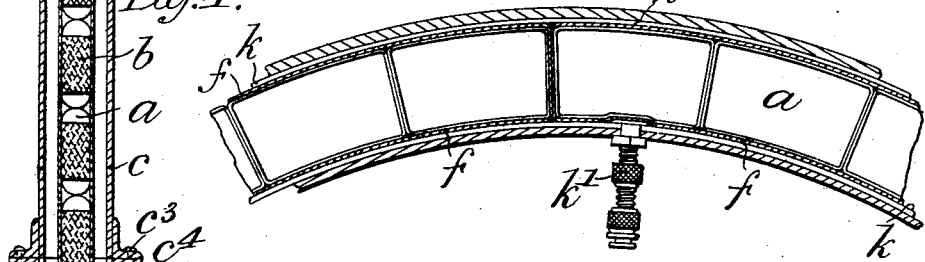
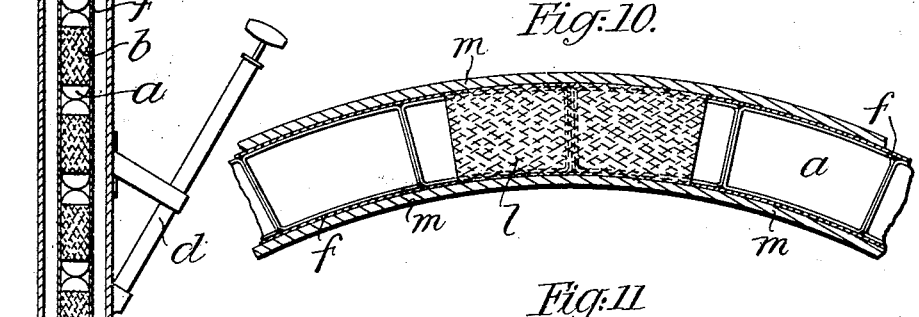
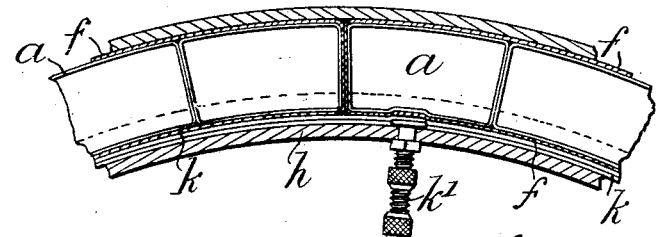
Witnesses:
M. A. Witherell
M. P. Hammond
Inventor,
Frank Mitchell,
By Knight Bros.
Attys.

UNITED STATES PATENT OFFICE.

FRANK MITCHELL, OF LONDON, ENGLAND.

PNEUMATIC TIRE.

SPECIFICATION forming part of Letters Patent No. 710,793, dated October 7, 1902.

Application filed July 3, 1902. Serial No. 114,752. (No model.)

*To all whom it may concern:*

Be it known that I, FRANK MITCHELL, a subject of the King of Great Britain, residing at London, England, have invented certain new and useful Improvements in and Relating to Pneumatic Tires for Cycles, Motor-Cars, and other Vehicles, of which the following is a full, clear, and exact description.

The invention relates to that class of pneumatic tire in which a number of small airtight chambers are employed to fill the whole internal space.

The object of the present invention is to provide means whereby the necessary pressure may be obtained in the said small airtight chambers and whereby they may more easily fill up the space caused by one or more of said air-tight chambers becoming punctured, thus equalizing the internal pressure of the tire at all points.

The invention further relates to means whereby I am enabled to place such a tire more easily on the wheel.

The invention is illustrated in the accompanying drawings, in which—

Figure 1 is an external view of an air-chamber made entirely of india-rubber, such as I propose to employ in the manufacture of pneumatic tires. Fig. 2 is an external view of a modified form of said chamber in which a restraining-cover is placed around the central portion thereof. Fig. 3 is a sectional view of an air-tight chamber, showing one method of producing the requisite pressure in air-chambers of the type shown in Fig. 1. Fig. 4 is a sectional view of an air-tight chamber, showing a method of producing the requisite pressure in air-chambers of the type shown in Fig. 2. Fig. 5 is a longitudinal section of part of a tire constructed according to one form of my invention, and Fig. 6 is a cross-section of the same. Fig. 7 is a cross-section of a similar tire fitted with a cover having endless wires, showing a special form of rim by means of which I am enabled more easily to fit the tire to the rim. Fig. 8 shows a method of locking the ends of the removable side. Fig. 9 is a sectional view of a tire constructed with my special air-chambers arranged inside an ordinary inflatable air-tube. Fig. 10 shows the invention applied to what is usually called a "single-tube tire," or, more correctly speaking, to a tire having a closed tube as the outer cover. Fig. 11 shows a method of retaining the requisite air-pressure in a tire when one or more of the air-chambers have become deflated.

The air-chambers $a$ are made of india-rubber, preferably of cylindrical form, having hemispherical ends. In Fig. 1 I have shown an air-chamber made entirely of india-rubber, which is closed at atmospheric pressure or slightly above the same. It is preferably made of thin material, so that when reduced in size by external pressure there shall be no undue lumps. It may be made of such a size that before any excess of pressure is placed therein it is the right diameter to fill the canvas bag in which it is to be placed. It is slightly expanded before closing, and when reduced in size, as hereinafter described, it will come back to its original dimensions. In Fig. 2 I have shown a similar chamber $a$, provided with a restraining-cover $b$ around the central portion thereof. This cover is made just to fit snugly the interior of the canvas bag into which it is to be placed.

In Fig. 3 I show a method of getting air-chambers $a$ of the type shown in Fig. 1 into a bag of canvas or other suitable material under the pressure required for running purposes. The metal chamber $c$ is provided with caps $c'$ and flanges $c^2$, which latter are connected by nuts and bolts $c^3$ for the purpose hereinafter explained. The chamber $c$ is also provided with an air-pump $d$. The air-chambers $a$ are placed in a bag $e$, of suitable thin material, closed at both ends. A tube $f$ of stronger material is supported in the lower part of the chamber $c$. In the drawings it is represented as hanging by tapes $f'$, which are attached to the chamber $c$ by passing into the joint between the upper and lower parts thereof. The bag $e$, containing the chambers $a$, has a weight $e'$ attached thereto and rests on the top of the tube $f$, with the weight $e'$ just inside the top of the tube $f$. The chamber $c$ is closed air-tight, and pressure is produced therein by means of the air-pump $d$. When sufficient pressure has been produced, it will cause the air-chambers $a$ to be reduced in size and will compress the air contained therein to the same pressure as that in the metal chamber $c$. The weight $e'$ will then draw the bag $e$, containing the chambers $a$, into the tube $f$. The air is then allowed to escape from the chamber $c$, and this latter is taken apart, when it will be found that the bag $e$ will be located in the tube $f$, the bag $e$ and tube $f$ being the same length, and the air-chambers $a$, being reduced in diameter, will retain the air contained therein under the necessary pressure. The tube $f$ is then removed and is ready to be inserted into an outer cover.

In Fig. 4 I show a similar chamber $c$ to that previously described, except that it is provided with means $c^4$ for closing the upper part of the tube $f$, already closed at the bottom, when the chambers $a$ have been inserted therein under pressure. In this case I employ only one tube, hereinafter called the "bag" $f$, supported by tapes $f'$ from the upper part of the chamber $c$. The air-chambers $a$, being restrained in diameter by the covers $a'$, will slip easily into the bag $f$, and a weight $e'$ is preferably placed on top of the chambers $a$. The chamber $c$ is closed and air-pressure is applied, causing the hemispherical ends of the chambers $a$ to become flat, thus reducing their length and increasing the pressure therein. When a weight $e'$ is employed, it assists in causing the chambers $a$ to fall to the bottom of the bag $f$. When sufficient pressure has been produced in the chamber $c$ and all the air-chambers $a$ are in the lower half of the chamber $c$, the screw $c^4$ is inserted until it jams the two sides of the bag $f$ together, the air-pressure is let off, the chamber $c$ is then opened, and the bag $f$ is secured just above the part held by the screw $c^4$. The bag $f$ is then ready to be inserted into an outer cover.

It will be understood that one or more bags $f$, containing air-chambers under pressure, may be employed to fill the interior of an outer cover. Fig. 5 shows one complete bag $f$ and portions of two adjacent bags meeting at the points marked $x$. When one of the air-chambers $a$ becomes punctured, if it is of the type shown in Fig. 1, the other air-chambers will expand and fill up the gap. When they are of the type shown in Fig. 2, the hemispherical ends will expand, and as the chambers are restrained in diameter and are not a tight fit in the canvas bag $f$ they will soon slide along in said bag and equalize the pressure therein.

Any of the usual forms of outer cover may be employed. I find that a cover $g$, having interlocking edges $g'$, as shown in Fig. 6, gives satisfactory results. The cover $g$ is placed around a number of the bags $f$, containing the air-chambers $a$ under pressure, and the edges $g'$ are interlocked. The complete tire may then be sprung onto a rim $h$, as the interlocking edges $g'$ are somewhat elastic longitudinally. If, however, a cover $i$, having two endless wires $i'$, is employed, I form the rim $j$ as shown in section at Fig. 7. The main portion $j$ of the rim is fitted with the spoke-nipples and has one side of the usual pattern to accommodate covers $i$, having endless wires $i'$. The portion $j$ has a recess $j'$ and a rib $j^2$. In conjunction with the main portion $j$ I use a strip or strips $j^3$, having a portion $j^4$ to fit the recess $j'$. In putting such a cover $i$ upon a rim one edge or endless wire is placed in position, the bags $f$, containing the air-chambers under pressure, are then placed under said cover, and the other side of the cover is wrapped around the bags $f$. The loose strip $j^3$ is then forced into position by lateral pressure until the portion $j^4$ jumps into the recess $j'$. The said strip $j^3$ would be made with a cut $j^5$ to allow it to expand in order to get it into place, and the ends $j^6$ would be provided with locking means, such as shown in Fig. 8, in which one side is provided with a hook $j^7$ to fasten onto a stud $j^8$. Such a strip $j^3$ may be made in two or more parts, each being provided with similar locking means.

In some cases I may insert the air-chambers $a$ inside an ordinary air-tube $k$, fitted with a valve $k'$, as shown in Fig. 9. In such a tire I may use fewer canvas bags $f$ and perhaps only one of sufficient length to encircle the rim. When some of the air-chambers in such a tire have become punctured, I can first repair the punctures in the air-tube $k$ and then inflate the same. The air-pressure in the air-tube will pass through the canvas bag $f$ and cause the air-chambers $a$ to become smaller, if of the type shown in Fig. 1, and these latter will then more easily spread themselves out around the tire and fill up any gaps caused by the punctured ones.

The tire shown in Fig. 10 is formed with one long canvas bag $f$, formed into the shape of a circle and containing sufficient air-chambers to fill the same. The ends are then joined by a piece of canvas $l$, solutioned to the same, and the whole is covered with india-rubber $m$.

In Fig. 11 I have shown a tire having an outer cover, a number of canvas bags $f$ filled with air-chambers $a$, and an inflatable air-tube $k$, arranged between the bags $f$ and the rim $h$. If it should happen that several air-chambers $a$ become punctured, and the pressure is thus reduced in the remaining ones, this deficiency of pressure may be counteracted by inflating the air-tube $k$, which would also expand and fill up any gaps between the chambers until new air-chambers can be inserted.

It is proposed to make the canvas bag $f$ of various lengths, so that a short one may be purchased containing the air-chambers $a$ under pressure, and in the case of tires of the type shown in Figs. 6 and 7, where the outer cover can be removed, the bags $f$, already located therein, may be moved by hand more closely together and a new canvas bag $f$ of short length may be inserted to fill up the space more completely.

In some cases the hemispherical ends of the air-chambers are also covered with canvas, especially in the case of heavy tires suitable for motor-cars and the like.

What I claim as my invention, and desire to secure by Letters Patent, is—

1. A pneumatic tire containing a number of closed air-chambers made of india-rubber arranged inside a canvas bag, the requisite air-pressure in the chambers being produced by external pressure prior to closing the bag.

2. A pneumatic tire containing a number of air-chambers made of india-rubber, with a restraining-cover, arranged inside a canvas bag, the requisite air-pressure being produced by external pressure prior to closing the bag.

3. In a pneumatic tire, the combination of a number of air-chambers, a restraining-cover placed around the center of each to prevent them extending laterally, uncovered ends, a canvas bag in which such air-chambers are placed, the requisite air-pressure being produced in said chambers by external pressure prior to closing the bag, and an outer cover, substantially as set forth.

4. A pneumatic tire containing a number of air-chambers which, after being reduced in size by external pressure, are confined by means of a canvas bag, substantially as set forth.

5. In a pneumatic tire, the combination of an outer cover, a number of air-chambers under pressure, a canvas bag containing such air-chambers which are reduced in size by external pressure prior to closing the bag, and means for closing the outer cover, substantially as set forth.

6. In a pneumatic tire, the combination of an outer cover having endless wires, a number of air-chambers, a canvas bag containing such air-chambers under pressure, which are reduced in size by external pressure prior to closing the bag, a rim with a recess, and a loose strip fitting said recess in the rim, substantially as set forth.

7. In a pneumatic tire, the combination of an outer cover, a number of air-chambers, a canvas bag containing such air-chambers under pressure, and an inflatable tube in which the canvas bag is placed, substantially as set forth.

8. In a pneumatic tire, the combination of an outer cover, a number of air-chambers, a canvas bag containing such air-chambers under pressure, and an inflatable tube arranged between such canvas bag and the rim, substantially as set forth.

9. In a pneumatic tire, the combination of a number of air-chambers $a$, a restraining-cover $b$ placed around the central part of each chamber to prevent lateral expansion and leaving the ends uncovered, a canvas bag $f$ in which said chambers are confined and tightly compressed endwise; and an outer cover, substantially as described.

In testimony whereof I affix my signature in presence of two witnesses.

F. MITCHELL.

Witnesses:
B. J. B. MILLS,
WM. GIRLING.